UNITED STATES PATENT OFFICE.

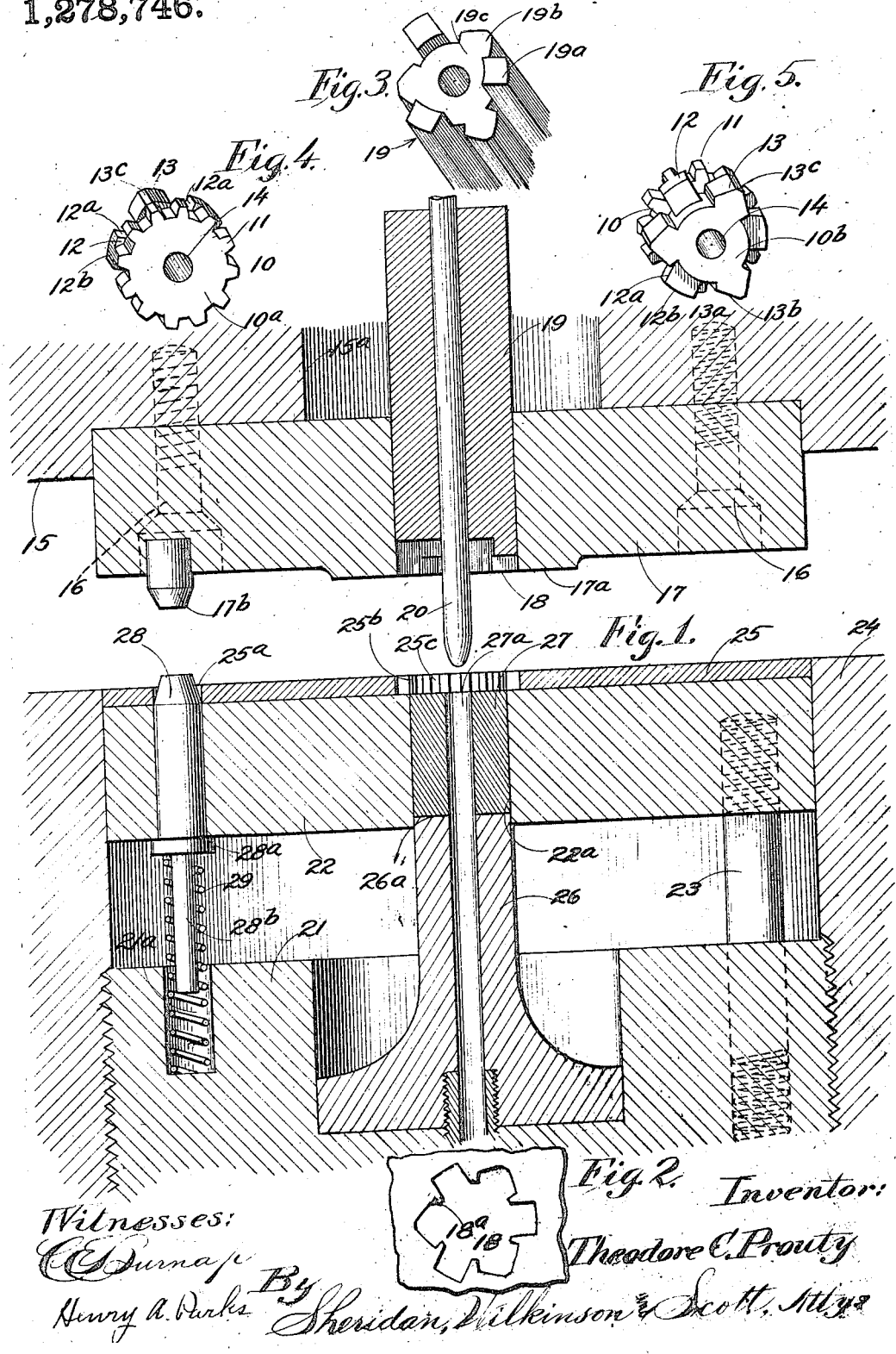
T. C. PROUTY.
PROCESS OF MAKING ODOMETER WHEELS.
APPLICATION FILED FEB. 9, 1915.
1,278,746.
Patented Sept. 10, 1918.

THEODORE C. PROUTY, OF AURORA, ILLINOIS, ASSIGNOR, BY MESNE ASSIGNMENTS, TO THE VAN SICKLEN COMPANY, A CORPORATION OF ILLINOIS.

PROCESS OF MAKING ODOMETER-WHEELS.

1,278,746.

Specification of Letters Patent. Patented Sept. 10, 1918.

Application filed February 9, 1915. Serial No. 7,188.

*To all whom it may concern:*

Be it known that I, THEODORE C. PROUTY, a citizen of the United States, residing at Aurora, in the county of Kane and State of Illinois, have invented certain new and useful Improvements in Processes of Making Odometer-Wheels, of which the following is a specification.

This invention relates to the process of making gear wheels of a form especially adapted for use in odometers, or the like.

This and other objects and advantages of my invention will be set forth more specifically in the following specification, taken in connection with the accompanying drawings, in which I have illustrated one embodiment of my gear wheel and one form of means for carrying out my improved process of forming gear wheels.

In the drawings—

Figure 1 shows a vertical section through a portion of a die press, showing the punch and die holders, and associated parts.

Fig. 2 is a partial inverted plan view of the punch plate shown in Fig. 1.

Fig. 3 is a perspective view of the lower end of the punch.

Fig. 4 is a perspective view of my improved gear wheel, looking at it from one side thereof; and Fig. 5 is a perspective view of my improved gear wheel, looking at it from the other side thereof.

Referring to the drawings, it will be seen that my improved gear wheel, designated generally by the numeral 10, comprises a plurality of series of gear teeth, in this case three series, designated by the numerals 11, 12 and 13, respectively. The series 11 is composed of relatively fine teeth having the usual form of cross section and contour, as shown particularly in Fig. 4. This series extends inwardly from the side $10^a$ of the gear wheel parallel to the axis thereof to the plane perpendicular to the axis which marks the beginning of the series of teeth 12, and also of the series of teeth 13. It will be seen that the teeth 13 extend parallel to the axis of the wheel from the termination of the series 11 to the opposite side or face $10^b$ of the gear wheel. The teeth of the series 13 are irregular in form, each side of each tooth being made up of a radially extending surface $13^a$ and an angularly disposed surface $13^b$, which extends therefrom to the vertex of the teeth, which is formed with a surface $13^c$. The teeth of the series 12 begin at the termination of the teeth 11, as previously described, and extend parallel to the axis toward the opposite face $10^b$ of the gear wheel, but terminate inwardly therefrom a considerable distance, as shown particularly in Fig. 5. Each tooth of the series 12 is formed with its lateral faces $12^a$ parallel to the axis of the tooth or radius of the wheel, and the teeth terminate at their outer ends in arcuate surfaces $12^b$. From an inspection of Fig. 5 it will be apparent that the same number of teeth are provided in each of the series 12 and 13, and that the teeth of the series 12 are angularly spaced between the teeth of the series 13, each tooth of the series 12 being preferably equidistant from each adjacent tooth of the series 13. Extending concentrically through the center of the gear wheel is an aperture 14, which provides a bearing by means of which the gear wheel is mounted.

My improved gear wheel, above described, is formed from malleable metal by my improved process in a manner which I will now set forth in connection with the apparatus shown in the drawings. This apparatus, which is adapted to be used with, and which forms a part of, a punch die press, comprises a punch holder 15, which is carried in the ram of the press to reciprocate vertically therewith, and seated in the lower face of this punch holder, and secured thereto by means of the screws 16, is a punch plate 17, which is centrally apertured at 18 to receive my improved form of punch 19. This punch, which is slidably mounted upon the downwardly extending pilot pin 20, extends upwardly into the chamber $15^a$ of the punch holder, and, when desired, may be caused to reciprocate with respect to said punch holder and punch plate by any suitable means. The punch 19 has a series of teeth projecting therefrom which correspond in location, size, and form of cross section to the teeth of the series 12 and 13 of the finished gear wheel. The projections $19^a$ of the punch correspond to the teeth of the series 12, while the projections $19^b$ correspond to the teeth of the series 13, and the projections $19^a$ extend downwardly beyond the surface $19^c$, which marks the terminations of the projections $19^b$, and also of the body of the punch, a distance equal to the distance between the face 10ᵇ of the gear wheel and the adjacent parallel faces of the teeth 12, measured parallel to the axis of the gear wheel.

The aperture 18 in the punch plate is provided with a plurality of vertically extending recesses which closely fit the projections 19ᵃ and 19ᵇ of the punch, thus leaving a plurality of corresponding inwardly extending projections 18ᵃ within the aperture 18, which correspond in form and cross section to the spaces between the teeth 12 and 13 of the finished gear wheel. When in its normal position with respect to the punch plate, the punch is so arranged that the lower extremities of the projections 19ᵃ, whose faces are perpendicular to the axis of the punch, are spaced upwardly from the lower face 17ᵃ of the punch plate a distance equal to the thickness of the teeth 12, measured parallel to the axis of the gear wheel. The punch plate is also provided with a downwardly extending tooth or lug 17ᵇ, for a purpose to be hereinafter described, and the surface 17ᵃ of said plate around the aperture 18 is spaced downwardly from the surrounding lower surface of the plate.

The lower member of the die press, which coöperates with the punch holder above described, comprises a die holder which includes a fixed member 21 and a movable member 22. This movable member is mounted upon pins or rods 23, which extend downwardly through the fixed member and which have springs or other resilient means coöperating with the lower ends thereof to maintain normally the member 22 in the position with respect to the member 21 shown in Fig. 1 of the drawings. The die holder also comprises a collar 24, which has threaded engagement with the fixed member, and this collar terminates a distance above the upper surface of the member 22, preferably substantially equal to the thickness of the die 25. A supporting block 26 is detachably, but rigidly, mounted in the fixed member 21, and terminates at its upper end in a cylindrical chamber 22ᵃ, which is provided in the movable member 22 of the die holder in a position concentric with the pilot pin 20. The upper surface 26ᵃ of the supporting block 26 forms a support for the blank 27 from which my improved gear wheels are formed.

The first step in the process of forming my gear wheels consists in forming the cylindrical blanks 27 by the use of a punch and die mechanism, or other suitable means, from malleable metal, preferably aluminum, or the like; and these blanks when completed have apertures 27ᵃ extending axially therethrough and having a cross-sectional area equal to that of the pilot pin 20 and of the aperture 14 in the finished gear wheel. Seated upon the upper surface of the movable member 22 is the die 25, which is retained in position thereon by the upwardly projecting collar 24, and also by means of the pin 28 which extends through an aperture 25ᵃ in the die in alinement with the lug 17ᵇ carried by the punch plate. The pin 28 is reciprocably mounted in the member 22, and is provided with a shoulder 28ᵃ which bears against the lower surface of the member 22 to limit its upward movement. Below the shoulder 28ᵃ the pin 28 is provided with a downwardly projecting portion 28ᵇ which extends into a recess 21ᵃ in the upper surface of the fixed member of the die holder. A coil spring 29 is seated in the recess 21ᵃ, and bears against the shoulder 28ᵃ to maintain normally the pin 28 in its uppermost position, as shown in the drawings. The die 25 is provided at its center with an aperture 25ᵇ, which is concentric with the cylindrical chamber 22ᵃ, and also with the pilot pin 20. The lateral walls of the aperture 25ᵇ are provided with inwardly extending projections or teeth 25ᶜ which correspond in form with the spaces between the teeth of the series of teeth 11 of the finished gear wheel.

In the operation of my mechanism for carrying out my improved process, I first form the blank 27, as above described, and seat the same in the chamber 22ᵃ, of equal size, in the die-holder. I then place the die 25 upon the die-holder, with the aperture 25ᵃ registering with the pin 28, after which I manipulate the die press to reciprocate the punch holder 15 downwardly into engagement with the die 25. As this occurs, the pilot pin will enter the aperture 27ᵃ formed in the blank, and at the same time the tooth or lug 17ᵇ of the punch plate 17 will enter the aperture 25ᵃ and move the pin 28 downwardly. As the downward movement of the punch holder continues the movable member 22 of the die-holder will move downwardly, owing to the resilient mounting thereof, and as this occurs the walls of the chamber 22ᵃ will move downwardly around the support 26, and the blank 27 will be projected upwardly into the chamber which is formed by the walls of the aperture 18 beneath the punch and the walls of the aperture 25ᵇ in the die. It will be seen that the lower plane face 19ᶜ of the punch 19 constitutes the upper wall of said chamber, while the upper plane face 26ᵃ of the supporting member 26 constitutes the lower wall of said chamber, and as the blank is projected into said chamber these plane surfaces operate to form the opposite plane faces or sides 10ᵇ and 10ᵃ, respectively, of the gear wheel, while the irregular lateral walls of the chamber operate to form the teeth of the finished gear wheel having the form illustrated in Figs. 4 and 5.

It will be understood that during the operation just described the punch 19 is fixed with respect to the punch plate 17 and punch holder 15 by any suitable means which may be employed for that purpose, and after the completion of the punching operation the punch holder is moved upwardly away from the die holder until the punch plate has moved a substantial distance from the die 25. At this point, the punch 19 is reciprocated downwardly by any suitable knock-out mechanism (not shown), in order to eject the finished gear wheel from the aperture 18 in the punch plate. On the next succeeding operation the punch 19 will be returned to its normal position, as shown in Fig. 1 by the pressure of the blank with which it contacts when the punch holder moves downwardly, and after said punch has reached its normal position the malleable blank will be compressed into the form of the finished gear wheel, as above described.

My process consists of first forming the cylindrical blank having the central aperture therethrough, then placing said blank in the chamber 22ª upon the support 26, and in then moving the walls of the confining chamber downwardly and compressing the blank, while at the same time projecting it into another confining inclosure having lateral surfaces conforming to the contour of the gear wheel to be formed.

I do not wish to be restricted to the process as described and illustrated herein except as defined in the appended claims.

I claim:

1. The process of manufacturing an odometer gear wheel, which consists in providing a cylindrical blank having an axial aperture therethrough, then confining said blank in an inclosing chamber, and then projecting said blank under pressure from said chamber into a chamber having walls conforming to the contour of the teeth of the wheel to be formed.

2. The process of manufacturing an odometer gear wheel, which consists in providing a blank of malleable metal, then confining said blank in an inclosure, and then projecting said blank under pressure into a second inclosure having walls adapted to form the finished wheel.

In testimony whereof I have subscribed my name.

THEODORE C. PROUTY.

Witnesses:
 HENRY A. PARKS,
 E. HALL.